US012639616B1

(12) United States Patent
Wang et al.

(10) Patent No.: US 12,639,616 B1
(45) Date of Patent: May 26, 2026

(54) EXPLOITING LEARNED SALIENCY TO OPTIMIZE MACHINE LEARNING TRAINING

(71) Applicant: XILINX, INC., San Jose, CA (US)

(72) Inventors: Erwei Wang, London (GB); Samuel R. Bayliss, Mountain View, CA (US)

(73) Assignee: XILINX, INC., San Jose, CA (US)

( * ) Notice: Subject to any disclaimer, the term of this patent is extended or adjusted under 35 U.S.C. 154(b) by 999 days.

(21) Appl. No.: 17/029,911

(22) Filed: Sep. 23, 2020

(51) Int. Cl.
| | |
|---|---|
| *G06N 20/00* | (2019.01) |
| *G06F 18/214* | (2023.01) |
| *G06V 10/46* | (2022.01) |
| *G06V 10/75* | (2022.01) |

(52) U.S. Cl.
CPC ........... *G06N 20/00* (2019.01); *G06F 18/214* (2023.01); *G06V 10/464* (2022.01); *G06V 10/754* (2022.01)

(58) Field of Classification Search
CPC .... G06N 20/00; G06F 18/214; G06V 10/464; G06V 10/754
See application file for complete search history.

(56) References Cited

U.S. PATENT DOCUMENTS

| | | | | |
|---|---|---|---|---|
| 6,741,757 | B1 * | 5/2004 | Torr | .................... G06V 30/2504 |
| | | | | 382/285 |
| 11,003,773 | B1 * | 5/2021 | Fang | ................... H04L 63/0263 |
| 11,704,535 | B1 * | 7/2023 | Vemuri | ................ G06N 3/0464 |
| | | | | 706/31 |
| 2010/0226564 | A1 * | 9/2010 | Marchesotti | ............ G06F 16/51 |
| | | | | 382/159 |

| | | | | |
|---|---|---|---|---|
| 2012/0330971 | A1 * | 12/2012 | Thomas | ................ G06F 16/283 |
| | | | | 707/748 |
| 2015/0310303 | A1 * | 10/2015 | Andreopoulos | ....... G06N 3/049 |
| | | | | 382/158 |
| 2015/0348565 | A1 * | 12/2015 | Rhoten | ................ G06F 16/243 |
| | | | | 704/270.1 |
| 2016/0342843 | A1 * | 11/2016 | Yuan | ....................... G06F 18/24 |
| 2018/0181593 | A1 * | 6/2018 | Ranzinger | ............. G06V 10/82 |
| 2018/0189635 | A1 * | 7/2018 | Olarig | ................... G06F 16/583 |
| 2019/0213167 | A1 * | 7/2019 | Bettencourt da Silva | ................... G06F 40/30 |
| 2019/0311216 | A1 * | 10/2019 | Rampal | ................ G06F 18/214 |

(Continued)

OTHER PUBLICATIONS

Lym, Sangkug, et al., "PruneTrain: Fast Neural Network Training by Dynamic Sparse Model Reconfiguration", SC '19, Nov. 17-22, 2019.

(Continued)

*Primary Examiner* — Cesar B Paula
*Assistant Examiner* — David Tan
(74) *Attorney, Agent, or Firm* — Patterson + Sheridan, LLP

(57) ABSTRACT

Embodiments herein describe techniques for setting and using saliency values to modify how a ML model is trained. In one embodiment, different blocks of data (referred to herein as tiles) are assigned respective saliency values. After performing one or more iterations, a training application can modify the default saliency values assigned to the tiles to reflect the importance of the tile. In one embodiment, the training application evaluates a weight gradient that indicates how a weight (or weights) corresponding to each tile are modified and modifies the saliency values accordingly. The ML training system can then use the saliency values to affect future training iterations to reduce the time required to train the ML model or save power.

17 Claims, 5 Drawing Sheets

(56) References Cited

U.S. PATENT DOCUMENTS

| | | | | | |
|---|---|---|---|---|---|
| 2019/0347553 | A1* | 11/2019 | Lo | ........................... | H03M 7/24 |
| 2020/0285898 | A1* | 9/2020 | Dong | ...................... | G06F 18/40 |
| 2020/0380289 | A1* | 12/2020 | Jagadeesh | .............. | H04N 23/67 |
| 2021/0097348 | A1* | 4/2021 | Shlens | ................. | G06F 18/214 |
| 2021/0099551 | A1* | 4/2021 | Cieslak | ......... | H04N 21/234363 |
| 2022/0092347 | A1* | 3/2022 | Su | .......................... | H04N 1/465 |

OTHER PUBLICATIONS

Gao, Xitong, et al., "Dynamic Channel Pruning: Feature Boosting and Suppression", ICLR, Jan. 28, 2019.
Liu, Zhuang, et al., "Learning Efficient Convolutional Networks through Network Slimming", ICCV, Aug. 22, 2017.
Chen, Yu-Hsin, et al., "Eyeriss: An Energy-Efficient Reconfigurable Accelerator for Deep Convolutional Neural Networks", IEEE Journal of Solid-State Circuits, vol. 52, No. 1, Jan. 2017.
Han, Son, et al. "Learning both Weights and Connections for Efficient Neural Networks", Advances in Neural Information Processing Systems, Oct. 30, 2015.

* cited by examiner

ML SYSTEM 100

EXPLOITING LEARNED SALIENCY TO OPTIMIZE MACHINE LEARNING TRAINING

TECHNICAL FIELD

Examples of the present disclosure generally relate to identifying saliency values corresponding to different blocks of data when performing machine learning (ML) training which enables different training strategies.

BACKGROUND

Training a machine learning model using a training set (e.g., a set of annotated images) can be time consuming and require a large amount of power. With the emergence of embedded artificial intelligence (AI) applications such as speech recognition, human emotion detection and household energy prediction comes the demand for energy-sensitive training solutions that are customized to particular end-users and must perform training at the edge of the network to drive high-specificity (e.g., transfer learning) that fits the product to a specific end user. This, combined with the growth of the size of machine learning models and the training sets used for ab-initio training in the data center means that there is a high demand for ML training strategies that take less time and less power, thereby saving power and mitigating the impact of scarce computer resources.

SUMMARY

One embodiment described herein is a machine learning (ML) training system that includes an integrated circuit configured to perform a plurality of training iterations to train a ML model and a training application configured to identify a weight gradient for updating weights in the ML model in response to the integrated circuit performing a first iteration of the plurality of training iterations and update respective saliency values assigned to a plurality of tiles based on the weight gradient, where the plurality of tiles are processed by the integrated circuit when performing the plurality of training iterations. Moreover, when performing a second training iteration of the plurality of training iterations, the integrated circuit is configured to process the plurality of tiles with saliency values that satisfy a threshold using a first strategy and the plurality of tiles with saliency values that do not satisfy the threshold using a second strategy, wherein the second strategy uses less compute resources than the first strategy.

Another embodiment described herein is a method that includes performing a first iteration for training a ML model, identifying a weight gradient for updating weights in the ML model in response to the first iteration, updating respective saliency values assigned to a plurality of tiles based on the weight gradient, and performing a second iteration for training the ML model, wherein, when performing the second iteration, the plurality of tiles with saliency values that satisfy a threshold are processed using a first strategy and the plurality of tiles with saliency values that do not satisfy the threshold are processed using a second strategy, wherein the second strategy uses less compute resources than the first strategy.

Another embodiment described herein is an integrated circuit includes a ML accelerator comprising a plurality of data processing engines (DPEs), and a plurality of tiles defining a group of pixels or samples, each of the plurality of tiles comprising a saliency value. The accelerator is configured to perform a first iteration to train a ML model using the DPEs and the plurality of tiles, receive updated saliency values for the plurality of tiles in response to a weight gradient derived from performing the first iteration, and perform a second iteration for training the ML model, where, when performing the second iteration, the plurality of tiles with saliency values that satisfy a threshold are processed using a first strategy and the plurality of tiles with saliency values that do not satisfy the threshold are processed using a second strategy. Further, the second strategy uses less compute resources than the first strategy.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
FIG. 1 illustrates a ML system that uses saliency values to affect training, according to an example.
Figure 1:
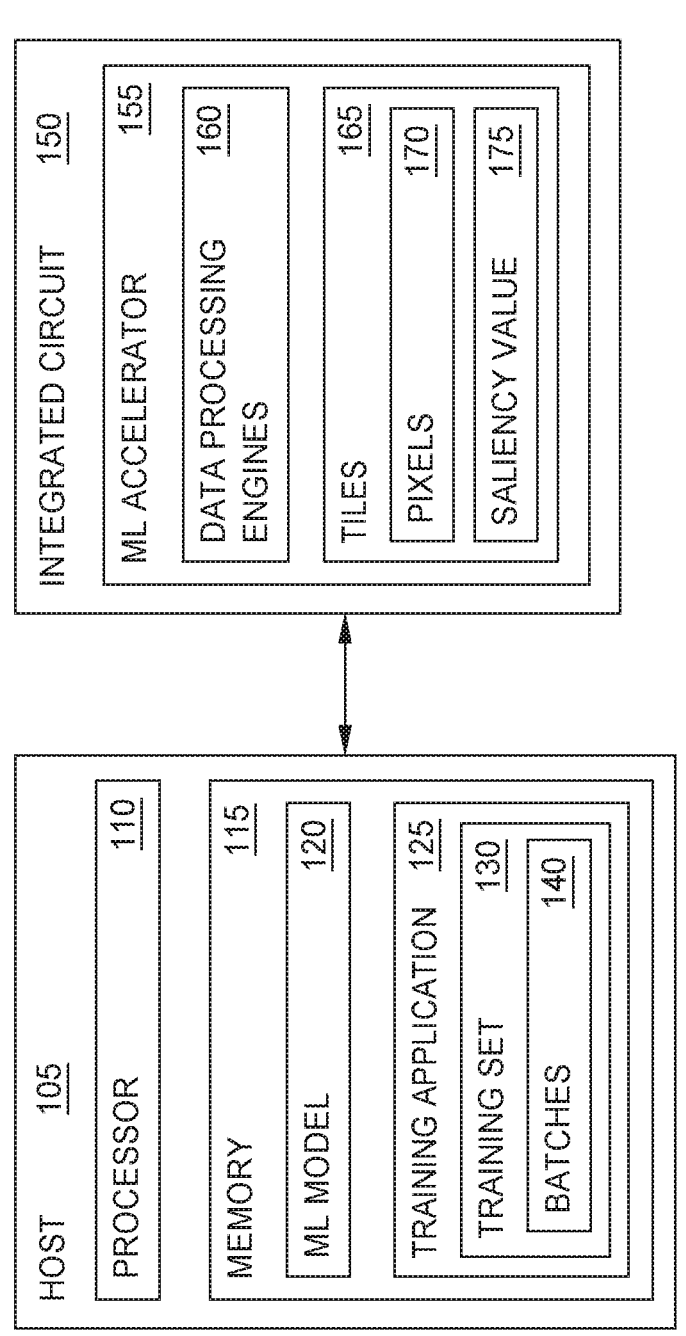

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for setting and using saliency values to modify how a ML model is trained. In one embodiment, different blocks of data (referred to herein as tiles) are assigned respective saliency values. For example, each tile may comprise a portion of at least one image (e.g., a 2×2 block of pixels) and one or more channels (or filters). After performing one or more iterations (e.g., processing a batch of training set data), a training application can modify the default saliency values assigned to the tiles to reflect the importance of the tile. In one embodiment, the training application evaluates a weight gradient that indicates how a weight (or weights) corresponding to each tile are modified. That is, after performing a training iteration, the training application evaluates the results and adjusts weights assigned to each layer. The amount the weights are changed by the training application is referred to as a weight gradient. If the weight gradient changes significantly, this indicates the training application has determined the corresponding layer (or more specifically, the tiles corresponding to the weights) are important—e.g., salient. In response, the training application increases the saliency values for those tiles. Alternatively, if the weight associated with a tile does not change, the saliency values may be left unchanged, or possibly reduced.

The ML training system can then use the saliency values to affect future training iterations. In one embodiment, the training system prunes tiles that have saliency values below a threshold, Put differently, the tiles are skipped or not processed. Doing so reduces the time required to train the ML model and also saves power. While pruning tiles is one way the saliency values can be used to optimize training, in other examples, the training system can use lower precision data for tiles with low saliency values, or sub-sample the tiles (e.g., process every other pixel or use a larger step function), or resample the color space of the tile, or apply different compression techniques or modify parameters of the compression technique to the data in the tile as they are transported in the system to reduce a data-transfer bandwidth. These optimization strategies can also use the saliency values to reduce the time and power required to perform ML model training, FIG. 1 illustrates a ML system 100 that uses saliency values to affect training, according to an example. The ML system 100 includes a host 105 that communicates with an integrated circuit 150. The host 105 can be a server in a data center, personal computer, laptop, and the like. The host 105 includes a processor 110 which represents one or more processing elements which each include one or more processing cores. The host 105 also includes a memory 115 which can include volatile memory elements, non-volatile memory elements, and combinations thereof.

In FIG. 1, the memory 115 stores a ML model 120 and a training application 125. The ML model 120 can be a neural network (e.g., a deep neural network) that includes a plurality of layers and weights. In one embodiment, the ML model 120 performs image processing, although the embodiments are not limited to such. In other embodiments, the ML model 120 performs speech recognition, text recognition, or time series classification. For example, the ML model 120 may be a convolution neural network (CNN) or other neural network suitable for characterizing objects in images.

The training application 125 is a software application that leverages the integrated circuit 150 to train the ML model 120. To do so, the training application 125 includes a training set 130 that can includes multiple annotated images. For example, the training set 130 can include thousands or millions of images that each includes an object that has been labeled (e.g., a chair, dog, cat, house, etc.). Thus, the training application 125 knows what kind of object is include in each of the images.

In this example, the training set 130 is organized by batches 140 (e.g., a subset of the images in the training set 130). In one embodiment, each time the training application processes one of the batches 140 (e.g., a training iteration), the training application 125 can evaluate the results output by the ML model 120, determine their accuracy relative to the known annotations (i.e., a validation accuracy), and then determine how to adjust the weights in order to provide a more accurate result the next time the batch 140 is re-run. As described in more detail below, the training application 125 also sets saliency values related to the data in the ML model 120 which reflect the importance of particular portions of an image (e.g., a set of pixels). For example, the pixels around the edge of the images may not be very important (e.g., may not have a substantial effect on the characterization or result generated by the ML model 12) while pixels near the center of the images are more important. These different portions of the images can be assigned different saliency values that affect how the ML system 100 processes these portions.

While the embodiments below discuss generating the saliency values which reflect the importance of particular portions of an image, the techniques herein can be used to generate saliency values for a ML model 120 that does speech recognition to identify syllables that can be ignored or for a ML model 120 that does text recognition to identify particular words that can be ignored.

The integrated circuit 150 includes a ML accelerator 155 for executing the ML model 120. That is, the training application 125 can instruct the ML accelerator 155 to process the batches 140 using the layers and weights defined in the ML model 120. The ML accelerator 155 can output a probability indicating the likelihood the images contain a particular object.

The integrated circuit 150 can be a field programmable gate array (FPGA), a system on a chip (SoC), a graphics processing unit (GPU), or application specific integrated circuit (ASIC) or any other integrated circuit implementation that can host an ML accelerator 155.

In this example, the ML accelerator 155 includes a plurality of data processing engines (DPEs) 160 for executing the layers in the ML models 120. For example, the ML accelerator 15 may include an array of interconnected DPEs 160. In one embodiment, the DPEs 160 include various multiply accumulate (MAC) operators. The DPEs 160 can have programmable flow control where blocks of computation can be skipped which can be useful for optimizing ML training based on saliency as discussed below. In other embodiments, the DPEs 160 may Single Instruction, Multiple Data (SIMD) or Single Instruction, Multiple Thread (SIMT) architectures that perform dense matrix multiplications when executing the ML model 120. However, these various computer architectures can take advantage of the embodiments herein that describe sparse network training where blocks of data can be pruned, or at least, their computation during a training iteration is reduced.

The ML accelerator 155 also includes tiles 165 which, in this embodiment, define a group or block of pixels 170 of an image. Each tile 165 may correspond to a different group of pixels (2×2, 3×3, 4×4, etc.) in an image. These may be spatial groupings of pixels, or groupings of the pixels in other dimensions such as channels. That is, when processing the images in the batches 140, the tiles 165 can be used to sub-divide the images into different blocks of data that are processed by the DPEs 160. For example, the DPEs 160 can perform matrix multiplication operations on the tiles 165 in parallel or sequentially.

In addition to defining a group of pixels 170, each tile 165 can include a saliency value 175 (e.g., a floating point value) that indicates an importance of the group of pixels 170 (e.g., a portion of the images). For example, if the images in the training set 130 typically have objects that are centered in the images while the edges of the images have a monotone color, the training application 125 may assign higher saliency values 175 to tiles 165 defining pixels 170 near the center of the images while the tiles 165 containing pixels 170 near the edges are assigned lower saliency values. These saliency values 175 can then be used to optimize the training of the ML model 120.

The tiles 165 can define other information in addition to the pixels 170 and the saliency values 175. In one embodiment, the ML system 100 tiles the feature maps into blocks that include a block of pixels, channels (e.g., filters), and images. For example, the tiles 165 may defined blocks of size 2×2×8×4 each containing 2×2 pixel locations with eight channels and four images. Four of such blocks form a 4×4×8×4 sized path which convolves with a 3×3×8×8 sized kernel to produce one block of outputs. The ML system 100 adds the saliency value (e.g., a floating point scaling factor) to each of the blocks or tiles 165 which may be multiplied with an input batch before convolution to determine how to process the tiles 165 using the DPEs 160.

Figure 2:
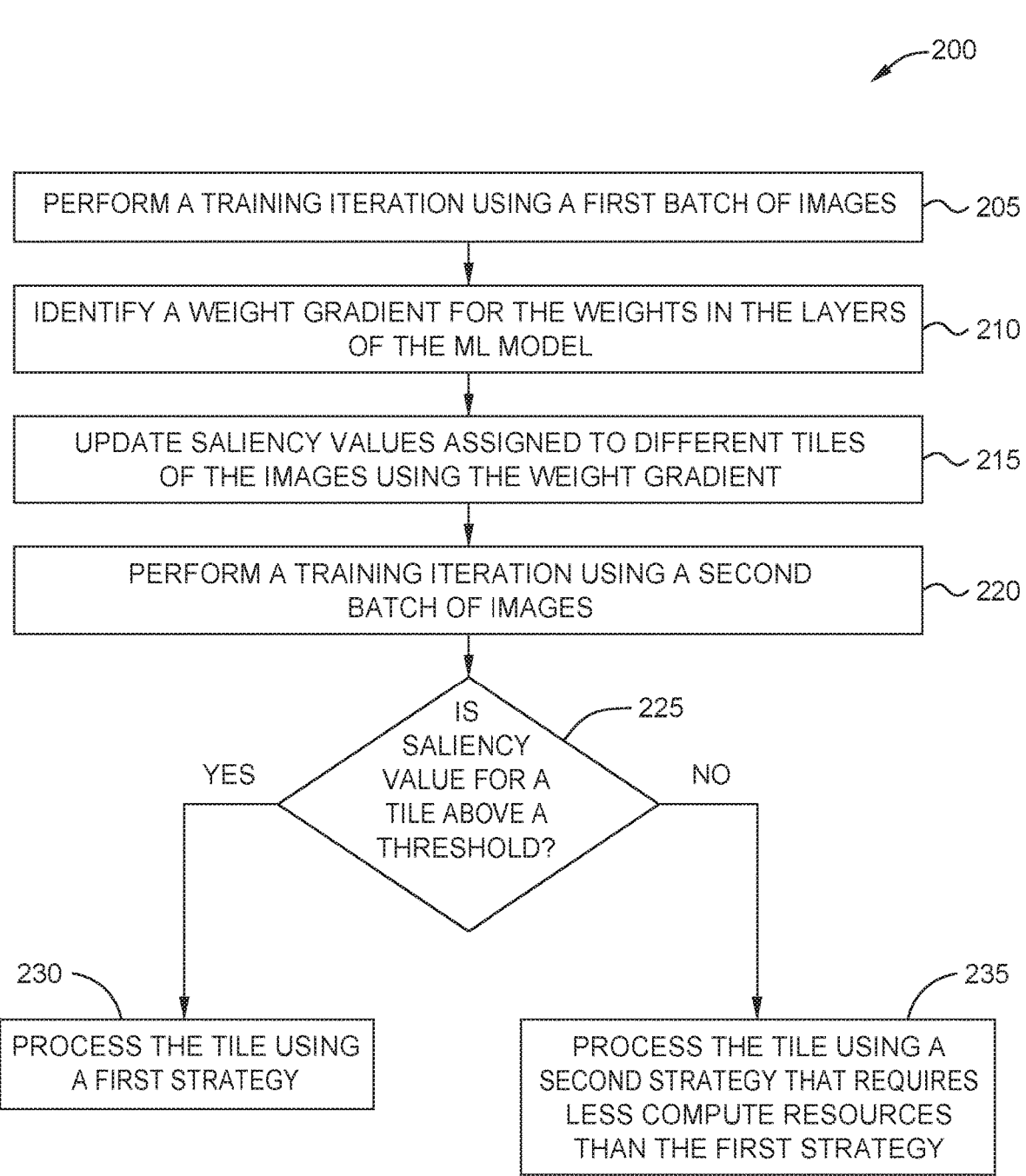
FIG. 2 is a flowchart for setting and using a saliency value to affect ML training, according to an example.

FIG. 2 is a flowchart of a method 200 for setting and using a saliency value to affect ML training, according to an example. The various blocks in method 200 are described as being performed by the ML system described in FIG. 2. At block 205, the ML accelerator performs a training iteration for the ML model using a first batch of images in the training set. In one embodiment, the training iteration performed at block 205 may be the first training iteration performed for the ML model. The ML system may assign default values to the weights in the layers, as well as the saliency values. For example, the saliency values may be assigned to default weights that indicate that all the corresponding tiles are important and should be processed during the first training iteration. As an alternative, the system may bootstrap saliency values using a pre-existing model of attentiveness which may be specific to the data-set being considered. In some applications, a model for saliency and initial parameters may be derived from the class labels in the data-set.

At block 210, the training application identifies a weight gradient for the weights in the layers of the ML model. That is, the training application evaluates the results of performing the training iteration at block 205 to determine how successful the ML model was in correctly predicting the objects in the images (e.g., a validation accuracy). The training application can use the annotations for the images to determine if they match the characterization of the images generated by the ML model. Based on how well the results of the ML model matched the annotation, the training application adjusts one or more of the weights in the layers. These changes to the weights from their previous (or default) values is referred to as the weight gradient. One goal of the training application is to adjust the weights so that ML model more accurately characterizes the objects in the images so they match the annotations in the training set.

At block 215, the training application updates the saliency values assigned to the different tiles using the weight gradient. In one embodiment, the training application determines whether the weight or weights corresponding to a particular tile (e.g., a block of data corresponding to a location of an image) changed in the weight gradient. If the training application did not change the weight, this may indicate the location of the images corresponding to the tile do not have a large impact on the characterization generated by the ML model—i.e., the tile is less salient or important. However, if the weight did change, this may indicate the location of the images corresponding to the tile has a large impact on the characterization generated by the ML model. If the weight(s) corresponding to a tile do not change, the training application may update the saliency value to indicate the corresponding tile is not salient (or is less salient). This may include keeping the saliency value at its previous value, or reducing the saliency value. In one embodiment, the system incorporates smoothing functions to manage the rate at which saliency values change or incorporate hysteresis functions to manage the thresholds at which saliency functions have effect on processing decisions. If the weight(s) do change, the training application updates the saliency value to indicate the corresponding tile is salient (or more salient) by increasing the saliency value. Of course, in other embodiments, the ML training system can be designed so that reducing the saliency value indicates the corresponding tile is more salient while increasing the saliency value is less salient.

In this manner, during an iteration (or over several iterations), the training application can identify the weight gradient and update the saliency values accordingly. Because the weights may change over multiple iterations, so can the saliency values. For example, the saliency values may change in ratio with the amount of change of the weights. If the weight for a first tile changes more than a weight for a second tile, the training application may change the saliency value for the first tile more than the saliency value for the second tile. However, in another example, if a weight changes a predefined threshold, the training application may increase the saliency value by a set amount, regardless of how much the change exceeds the predefined threshold.

Further, the training application may reduce the saliency values, During some iterations, the training application may see large weight gradients for certain tiles, and in response, increase their saliency values. However, during subsequent iterations, the weights for the tiles may not change (or change little). In response, the training application may decrease the saliency values, Thus, the saliency values can increase and decrease as multiple training iterations are performed.

At block 220, the ML accelerator performs a subsequent training iteration using a second batch of images from the training set.

At block 225, the ML accelerator determines whether a saliency value for each tile is above a threshold before processing the tiles. For example, the ML accelerator may include a saliency threshold where tiles with saliency values above the threshold are deemed salient while tiles with saliency values below the threshold are not. When starting the training process, the default saliency values may be above this threshold, but overtime, the saliency values may change (or the threshold may move) so that some of the tiles have saliency values above the threshold while others do not.

If a tile has a saliency value above the threshold, the method 200 proceeds to block 230 where the ML accelerator processes the tile using a first strategy. In one embodiment, the first strategy is a default strategy where the tile (and the block of data it defines) is sent to the DPEs and processed as normal.

However, if the saliency value is below the threshold, the method 200 proceeds to block 235 where the ML accelerator processes the tile using a second strategy that uses less computing resources than the first strategy. That is, rather than using a normal or default strategy, the second strategy can reduce the time used to process the tile relative to the first strategy, or may use less power than the first strategy.

There are any number of techniques for reducing the computing resources used for processing tiles with saliency values below the threshold. In one embodiment, the ML accelerator may prune or skip the tiles. That is, the tiles are not sent to the DPEs for processing, or if they are sent, the DPEs are instructed not to process the data corresponding to the tiles. In another example, the ML accelerator may sub-sample the tiles (process every other sample in the tiles) or use a larger stride so that the amount of data processed by the DPEs is reduced relative to the processing the tile using the first strategy, Thus, in this example, the tile is processed by the DPEs, but processing may take less time, be performed using fewer hardware resources, or require less power. In another example, the ML accelerator may reduce the precision of the pixel data in the tiles (e.g., use integer values rather than floating point) or may alter the number of bits used to represent integer computation, or may change the configuration of the floating point format used to capture more dynamic range or more precision (e.g., change the relative sizes of the mantissa and exponent fields in at least one tile processed by the DPEs. This too can reduce the computing resources used by the system by saving power, using less hardware resources (which can then be used by other operations), increasing accuracy, or reducing power consumption.

In this manner, the ML accelerator can use the saliency values to affect how the tiles (which represent spatial data in the images) are processed during subsequent training iterations. As the saliency values change in response to weight gradients, the ML accelerator can change how it processes the tiles. Further, while the method 200 discussed using one saliency threshold at block 225, in other embodiments, the ML accelerator may use multiple saliency thresholds where different processing strategies are used depending on where the saliency values fall among the thresholds. For example, if two thresholds are used, saliency values above the highest threshold may be performed using the first (or default strategy). Saliency values below the highest threshold but above the lowest threshold may be processed by sub-sampling the tiles or increasing the stride. Saliency values below the lowest threshold may be pruned or skipped. In this manner, the thresholds can parse or categorize the saliency values into different buckets (e.g., most important, somewhat important, not important, etc.) where each bucket corresponds to a different processing strategy.

Figure 3:
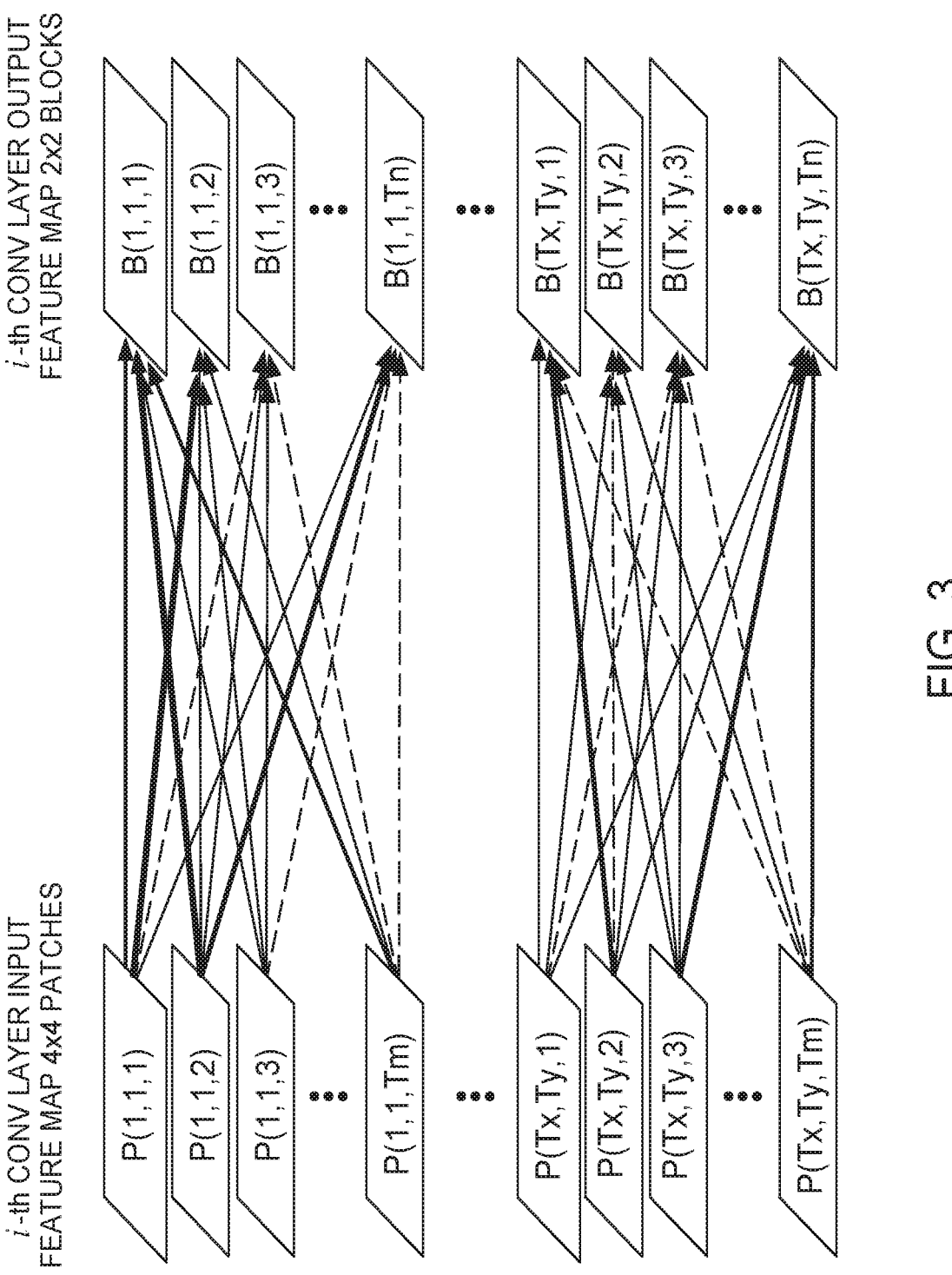
FIG. 3 illustrates block-wise sparsification in a convolution layer, according to an example.

FIG. 3 illustrates block-wise sparsification in a convolution layer, according to an example. Specifically, FIG. 3 illustrates a convolution layer where an input feature map of 4×4 patches that have tiling factors Tx, Ty, Tm and Tn along width, height, input, and output channels, respectively. The width of the connections between the input feature map and an output feature map of 2×2 blocks represents the magnitude of saliency values of corresponding tiles (not shown). That is, the thicknesses of the solid arrows connecting the input feature map to the output feature map represent the saliency values of the underlying tiles. In this example, a thicker arrow indicates the salience value for the corresponding tile is more salient. On the other hand, the dotted arrows indicate that a corresponding tile has been pruned because the saliency value is below a threshold. In this manner, FIG. 3 illustrates how the method 200 can be used to result in a sparse (e.g., reduced computation) convolution layer during a training process.

Figure 4:
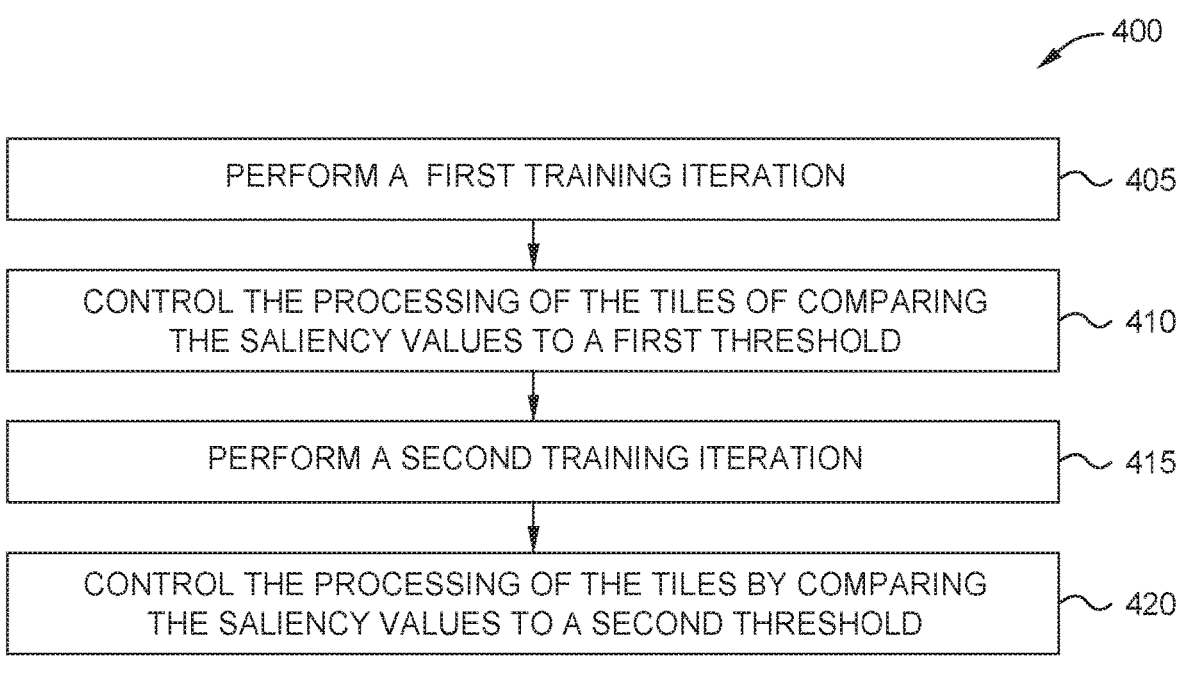
FIG. 4 is a flowchart for modifying a saliency threshold over multiple training iterations, according to an example.

FIG. 4 is a flowchart of a method 400 for modifying a saliency threshold over multiple training iterations, according to an example. At block 405, the ML accelerator performs a first training iteration on a first batch of training images, At block 410, the ML accelerator controls the processing of the tiles by comparing the saliency values to a first threshold. For example, the first threshold may be a default threshold that is used when the training process first begins. The default threshold may be set so that each of the default saliency values is above the threshold so that the tiles are processed according to the first strategy as illustrated in FIG. 2. Although not discussed here, the ML accelerator can adjust the saliency values in response to any weight gradients identified by the training application after performing the first iteration.

At block 415, the ML accelerator performs a second training iteration that follows the first training iteration. At block 420, the ML accelerator controls the processing of the tiles by comparing the saliency values to a second threshold, different from the first threshold used at block 410. For example, when first performing training, the training application may keep the threshold low so that most or all of the tiles are processed using the first strategy. However, over time, the training application may increase the threshold so that more tiles are performed using the second strategy which saves time or power. Stated differently, the training application may increase the threshold so that the training process focuses more on the salient tiles and less on the non-salient tiles.

In another example, the second threshold may be lower than the first threshold. For example, if the method 400 occurs near the end of training, the training application may reduce the threshold so that tiles that were previously considered non-salient are now considered salient. Doing so may permit the training application to catch any errors where important tiles were mistakenly marked as being unimportant, and thus, were being ignored. By reducing the threshold, the training application may process these tiles using the first strategy which gives the training application an opportunity to recognize the tiles (and their corresponding weights) are salient and adjust the weights accordingly.

Further, the method 400 can be used if multiple saliency thresholds are considered. For example, the thresholds may be adjusted up or down in lockstep, or the separation distance between the thresholds can be increased or decreased over multiple training iterations.

Figure 5:
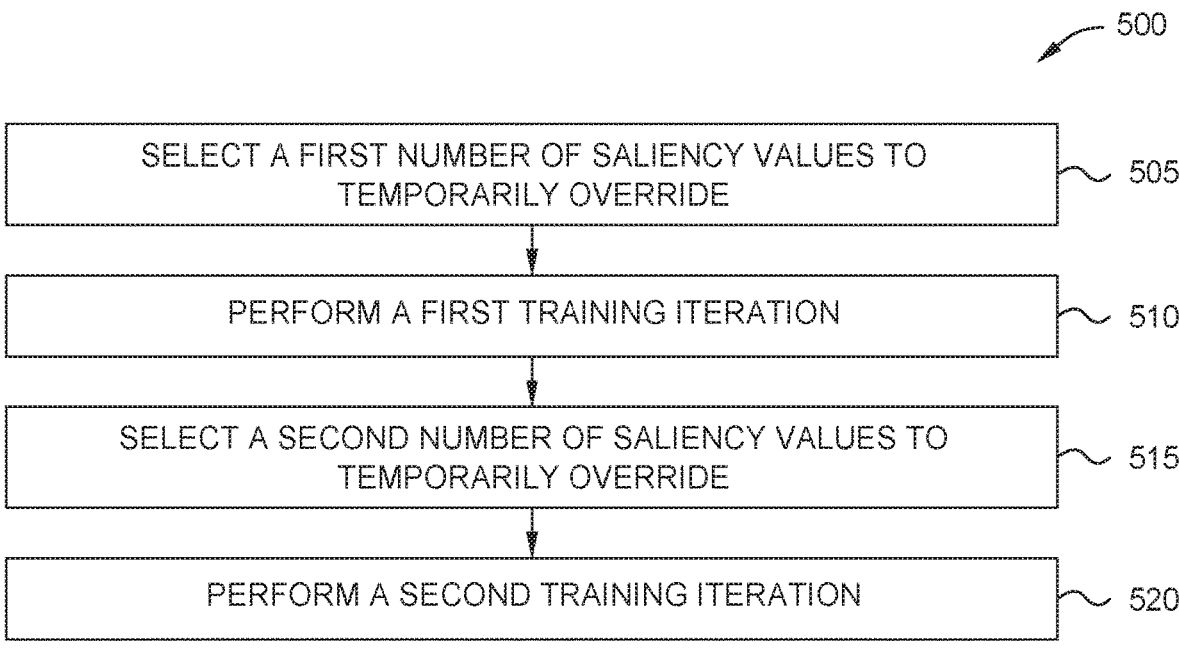
FIG. 5 is a flowchart for overriding saliency values or thresholds over multiple training iterations, according to an example.

FIG. 5 is a flowchart of a method 500 for overriding saliency values or thresholds over multiple training iterations, according to an example. As mentioned in method 400, a tile (and corresponding weight(s)) may mistakenly be identified as non-salient when it in fact it covers important pixels (or a location) in the image. The method 500 provides strategies to reduce the risk that the training process ignores an important tile.

At block 505, during a training iteration, the ML accelerator selects a first number of saliency values to temporary override. In one embodiment, the ML accelerator may randomly select a certain percentage of the non-salient tiles (e.g., 5%) to treat as salient tiles. In response, the ML accelerator processes the randomly selected tile using the first strategy while the remaining tiles are processed using the second strategy. If the randomly selected tile is salient, the training application may changes its corresponding weight, which increases the saliency value of the tile so that it might now be greater than the saliency threshold so that during the next training iteration the tile is processed using the first strategy. In another example, the ML accelerator may, according to a schedule, change non-salient tiles to salient-tiles for one or more training iterations. For example, if a non-salient tile (e.g., a tile with a saliency value below the threshold) has been processed using the second strategy for a threshold number of iterations (e.g., twenty consecutive training iterations), for the next training iteration (or the next several training iterations) the ML accelerator treats the tile as a salient tile so that it gets processed using the first strategy.

At block 510, the ML accelerator performs a first training iteration where the selected number of non-salient tiles is instead treated as salient tiles. As mentioned above, this may increase the chance that the training application will change the weight associated with a tile that has been mistakenly characterized as non-salient, thereby increasing its saliency value.

At block 515, the ML accelerator selects a second number of saliency values to temporary override. For example, the ML accelerator may select another random group of the non-salient tiles to treat as salient tiles, or evaluate the schedule to determine if one or more the non-salient tiles should be treated as salient tiles.

At block 520, the ML accelerator performs a second training iteration where the second number of selected non-salient tiles are processed using the first strategy rather than the second strategy. In this manner, the ML accelerator can periodically select one or more of the non-salient tiles to treat as a salient tile for one or more training iterations. Doing so reduces the risk that the training process degrades into a training lock where it focuses only on certain portions of the images (the portions corresponding to tiles deemed salient) but does not consider other portions of the images which may have important information that can be used to characterize the images (the portions of the images corresponding to tiles mistakenly deemed non-salient).

Figure 6:
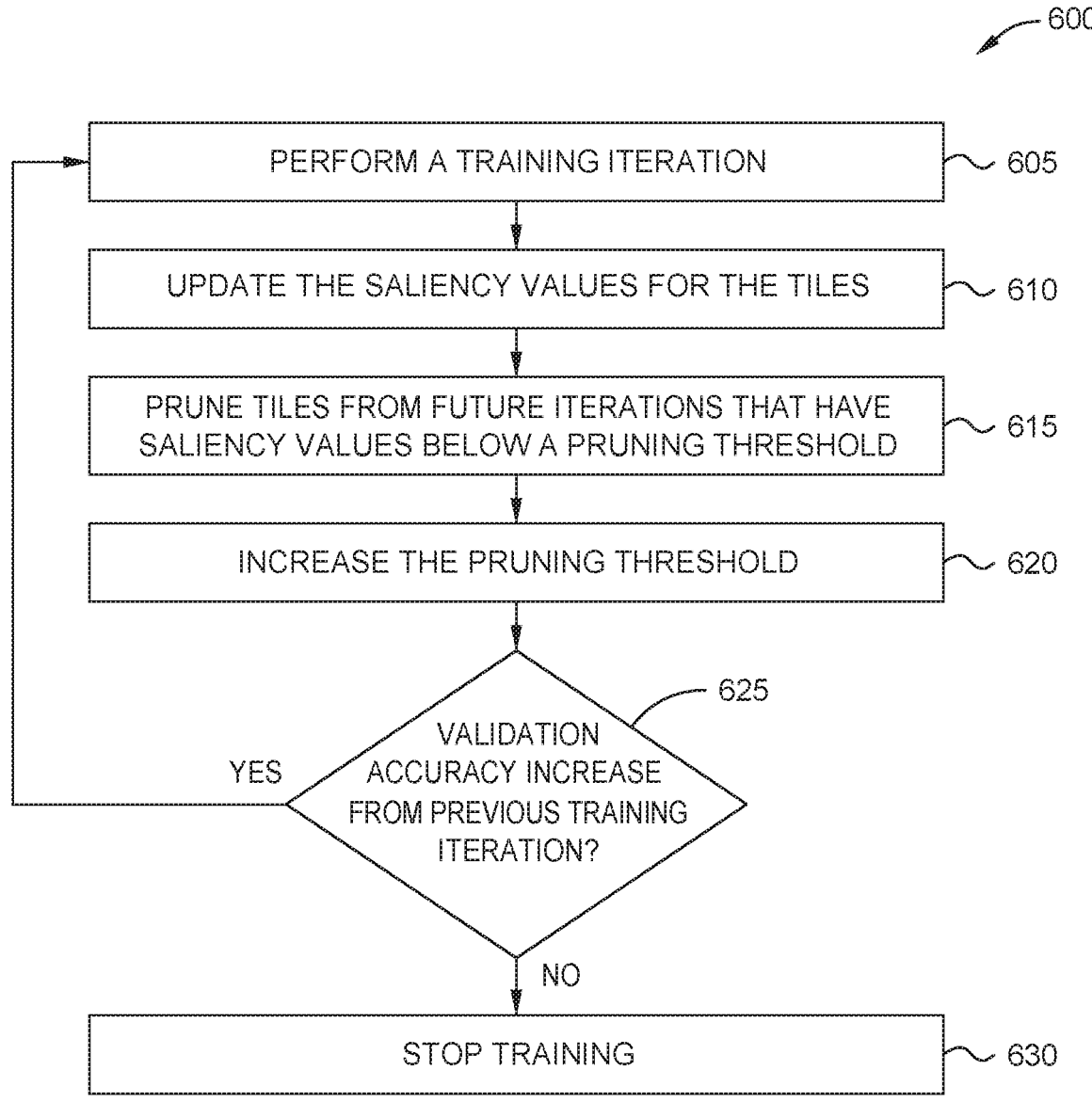
FIG. 6 is a flowchart for using saliency values to perform fine-grained pruning over multiple training iterations, according to an example.

FIG. 6 is a flowchart of a method 600 for using saliency values to perform fine-grained pruning over multiple training iterations, according to an example. At block 605, the ML accelerator performs a first training iteration.

At block 610, the ML accelerator updates the saliency values for the tiles, which include using any of the techniques described above in block 210 of method 200.

At block 615, the ML accelerator prunes tiles from future iterations that have saliency values below a pruning threshold, That is, in this example, the ML accelerator skips or prunes the tiles with saliency values below the pruning threshold from being processed by the DPEs in subsequent training iterations. However, in other embodiments, instead of pruning the tiles, the ML accelerator may sub-sample, or reduce the data precision of the tiles with saliency values below the pruning threshold.

At block 620, the ML accelerator increases the pruning threshold. Doing so raises the threshold between the tiles considered salient and the ones considered non-salient. Assuming the saliency values do not change, increasing the pruning threshold increases the number of tiles that are pruned from future training iterations.

The ML accelerator can increase the pruning threshold using a predefined step (e.g., increase the threshold a certain percentage every training iteration, or for every X number of training iterations) or increase the pruning threshold using a variable amount. For example, the ML accelerator may increase the pruning threshold in response to how many of the tiles are marked salient versus how many are deemed non-salient. If there are currently many more salient tiles than non-salient, the ML accelerator may increase the pruning threshold more than if the numbers of salient and non-salient tiles were more equal.

At block 625, the training application determines whether the validation accuracy of the ML model has increased from the previous training iteration. That is, the training application determines whether the results output by the ML model during the current training iteration were more accurate than the results the ML model output during the previous iteration. If the results have improved, the method 600 can update the weights of the layers (to hopefully again improve the validation accuracy) and returns to block 605 where another training iteration is performed (e.g., using another batch of images, or on the same batch of images).

If the validation accuracy did not improve, the method 600 proceeds to block 630 where the training application stops training and indicates to the host that the ML model has been fully trained. In this manner, by updating the saliency values and changing (e.g., increasing) the pruning threshold, the ML accelerator can identify and focus on the salient tiles (e.g., the important features) of the images and prune (e.g., ignore) the less important tiles, thereby saving computing resources such as time and power.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
an accelerator circuit comprising data processing engines (DPEs) configured to train a multi-layer neural network machine-learning model (ML model) based on training data and associated labels:
  segment the training data into tiles, wherein the tiles comprise one or more of multiple pixels and multiple syllables of speech;
  assign salience values to the tiles;
  assign weights to layers of the ML model;
  perform a first ML training iteration on the tiles, including to process the tiles based on the weights of the respective layers and at levels of precision that are based on the salience values of the respective tiles;
  adjust the weights based on validation results of the first ML training iteration;
  adjust the salience values of the tiles based on the adjustments to the weights, including to increase the salience value of a tile for which a weight gradient meets a salience threshold, such that the adjusted salience value reflects importance of the tile in training the ML model; and
  perform a second ML training iteration on the tiles, including to process the tiles based on the adjusted weights of the respective layers and levels of precision that are based on the adjusted salience values of the respective tiles, including to increase the level of precision at which the tile is processed.

2. The integrated circuit of claim 1, wherein the labeled training data comprises images, wherein the tiles comprise groups of pixels of the respective images, and wherein the adjustments to the salience values represent relative importance of pixels of the respective images in training the ML model.

3. The integrated circuit of claim 1, wherein the labeled training data comprises speech, and wherein the adjustments to the saliency values represent relative importance of different syllables or words in training the ML model.

4. The integrated circuit of claim 1, wherein the DPEs are further configured to:
  prune tiles for which the adjusted salience values do not meet a threshold such that the pruned tiles are not processed during the second ML training iteration; and
  perform the second ML training iteration on remaining ones of the tiles based on the weights of the respective layers and at the levels of precision that are based on the adjusted salience values of the respective remaining tiles.

5. The integrated circuit of claim 1, wherein the levels of precision comprise levels of pixel precision.

6. The integrated circuit of claim 1, wherein the levels of precision comprise levels of sampling precision.

7. The integrated circuit of claim 1, wherein the levels of precision comprise levels of computational precision.

8. The integrated circuit of claim 1, wherein the DPEs are further configured to:

prune tiles for which the adjusted salience values do not meet the salience threshold such that the pruned tiles are not processed during the second ML training iteration; and increase the salience threshold for a subsequent ML training iteration.

9. The integrated circuit of claim 1, wherein the ML model comprises a convolutional neural network ML model.

10. A method, comprising:

training a multi-layer neural network machine-learning model (ML model) based on training data and associated labels, comprising:

segmenting the training data into tiles, wherein the tiles comprise one or more of multiple pixels and multiple syllables of speech;

assigning salience values to the tiles;

assigning weights to layers of the ML model;

performing a first ML training iteration on the tiles, comprising processing the tiles based on the weights of the respective layers and at levels of precision that are based on the salience values of the respective tiles adjusting the weights based on validation results of the first ML training iteration;

adjusting the salience values of the tiles based on the adjustments to the weights, including increasing the salience value of a tile for which a weight gradient meets a salience threshold, such that the adjusted salience value reflects importance of the tile in training the ML model; and performing a second ML training iteration on the tiles, comprising processing the tiles based on the adjusted weights of the respective layers and at levels of precision that are based on the adjusted salience values of the respective tiles including increasing the level of precision at which the tile is processed.

11. The method of claim 10, further comprising:

pruning tiles for which the adjusted salience values do not meet a threshold such that the pruned tiles are not processed during the second ML training iteration;

wherein the performing the second ML training iteration comprises performing the second ML training iteration on remaining ones of the tiles based on the adjusted weights of the respective layers and at the levels of precision that are based on the adjusted salience values of the respective remaining tiles.

12. The method of claim 10, wherein the levels of precision comprise one or more of:

levels of sampling precision;

levels of pixel precision; and levels of computational precision.

13. The method of claim 10, wherein the ML model comprises a convolutional neural network ML model.

14. A system, comprising:

a host comprising a host processor and memory encoded with an application program that includes instructions for training a multi-layer neural network machine-learning model (ML model); and an accelerator circuit comprising a plurality of data processing engines (DPEs) configured to train the ML model on behalf of the host processor based on training data and associated labels, including to segment the training data into tiles, wherein the tiles comprise one or more of multiple pixels and multiple syllables of speech;

assign salience values to the tiles;

assign weights to layers of the ML model;

perform a first ML training iteration on the tiles, including to process the tiles based on the weights of the respective layers and at levels of precision that are based on the salience values of the respective tiles;

adjust the weights based on validation results of the first training iteration;

adjust the salience values of the tiles based on the adjustments to the respective weights, including to increase the salience value of a tile for which a weight gradient meets a salience threshold, such that the adjusted salience value reflects importance of the tile in training the ML model; and perform a second ML training iteration on the tiles, including to process the tiles based on the adjusted weights of the respective layers and levels of precision that are based on the adjusted salience values of the respective tiles, including to increase the level of precision at which the tile is processed.

15. The system of claim 14, wherein the DPEs are further configured to:

prune tiles for which the adjusted salience values do not meet a threshold based on programmable flow control, such that the pruned tiles are not processed during the second ML training iteration; and perform the second ML training iteration on remaining ones of the tiles based on the weights of the respective layers and at the levels of precision that are based on the adjusted salience values of the respective remaining tiles.

16. The system of claim 14, wherein the ML model comprises a convolution neural network ML model.

17. The system of claim 14, wherein the levels of precision comprise one or more of:

levels of sampling precision;

levels of pixel precision; and levels of computational precision.

\* \* \* \* \*